United States Patent
Flynn et al.

(10) Patent No.: US 10,162,042 B1
(45) Date of Patent: Dec. 25, 2018

(54) METHODS AND DEVICES FOR CODING POSITION IN V2X COMMUNICATIONS

(71) Applicants: BlackBerry Limited, Waterloo (CA); 2236008 Ontario Inc., Waterloo (CA)

(72) Inventors: David Flynn, Darmstadt (DE); Gaëlle Christine Martin-Cocher, Toronto (CA)

(73) Assignees: BlackBerry Limited, Waterloo, Ontario (CA); 2236008 Ontario Inc., Waterloo, Ontario (CA)

( * ) Notice: Subject to any disclaimer, the term of this patent is extended or adjusted under 35 U.S.C. 154(b) by 0 days.

(21) Appl. No.: 15/958,318

(22) Filed: Apr. 20, 2018

(51) Int. Cl.
| H04W 4/02 | (2018.01) |
| G01S 5/00 | (2006.01) |
| G01S 19/05 | (2010.01) |
| H04W 4/40 | (2018.01) |
| H04W 64/00 | (2009.01) |

(52) U.S. Cl.
CPC ............ *G01S 5/0072* (2013.01); *G01S 19/05* (2013.01); *H04W 4/02* (2013.01); *H04W 4/40* (2018.02); *H04W 64/003* (2013.01)

(58) Field of Classification Search
CPC .......... H04W 4/023; H04W 4/20; H04W 4/21
See application file for complete search history.

(56) References Cited

U.S. PATENT DOCUMENTS

| 7,592,949 | B2 * | 9/2009 | Schantz | G01S 5/14 342/165 |
| 8,031,111 | B2 * | 10/2011 | Ferguson | G01S 19/04 342/357.4 |
| 8,629,803 | B2 * | 1/2014 | Pattabiraman | G01S 19/11 342/357.29 |
| 8,643,538 | B2 * | 2/2014 | Schantz | H04B 5/0075 342/118 |
| 2010/0085249 | A1 * | 4/2010 | Ferguson | G01S 19/04 342/357.41 |
| 2015/0134588 | A1 * | 5/2015 | Jonas | G06Q 10/063 706/58 |

* cited by examiner

*Primary Examiner* — Diane Mizrahi
(74) *Attorney, Agent, or Firm* — Rowand LLP

(57) ABSTRACT

Methods and devices for coding and communicating geographical position. The sending device quantizes the geographical coordinate system and sends its position as the delta or remainder after quantization. The receiving device determines its own quantized position and disambiguates between possible quantized coordinate positions of the sending device to identify the sending device's actual quantized coordinate position. From this, the receiving device determines the position of the sending device using the identified actual quantized coordinate position and the delta position data sent by the sending device. The receiving device may then trigger an action based on the determined position of the sending device.

24 Claims, 6 Drawing Sheets

1

METHODS AND DEVICES FOR CODING POSITION IN V2X COMMUNICATIONS

FIELD

The present application generally relates to coding positional data in location-determining systems and, in particular, mechanisms for more efficiently coding position information to enable one device to communicate its position to another device using vehicle-to-everything (V2X) communications.

BACKGROUND

V2X communications involve communications to a vehicle from another device, or from a vehicle to another device. That other device may be another vehicle (vehicle-to-vehicle (V2V)), roadside infrastructure (vehicle-to-infrastructure (V2I)), a pedestrian (vehicle-to-pedestrian (V2P)), or any other device (vehicle-to-device (V2D)). The communication is typically a localized short-range communication, such as using the WLAN IEEE 802.11 family of standards (e.g. Wireless Access in Vehicular Environments (WAVE) communications), although the present application is not limited to such communications and may be implemented in coding position data in the context of V2X communications over a non-short-range channel.

One of the issues regularly encountered in intelligent transportation systems is the determination of position of another element in the system. For example, automated tolling systems typically need to identify the location of a passing vehicle for toll purposes (some systems refer to this as "lane assignment"). Information sent to the vehicle regarding approaching emergency vehicles, upcoming traffic problems or roadworks, or nearby roadside features or the like, may include location information for the nearby device or vehicle. Likewise, the vehicle may need to communicate its location to nearby vehicles or nearby roadside infrastructure.

Location information is typically obtained using a Global Navigation Satellite System (GNSS) such as the Global Positioning System (GPS) or the like. Location may be expressed in some cases using latitude and longitude coordinates expressed in decimal degrees, for example.

Location information in V2X typically needs to be communicated quickly and accurately, and may in some cases involve use of a congested channel with transmission collisions and/or low-energy transmissions.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
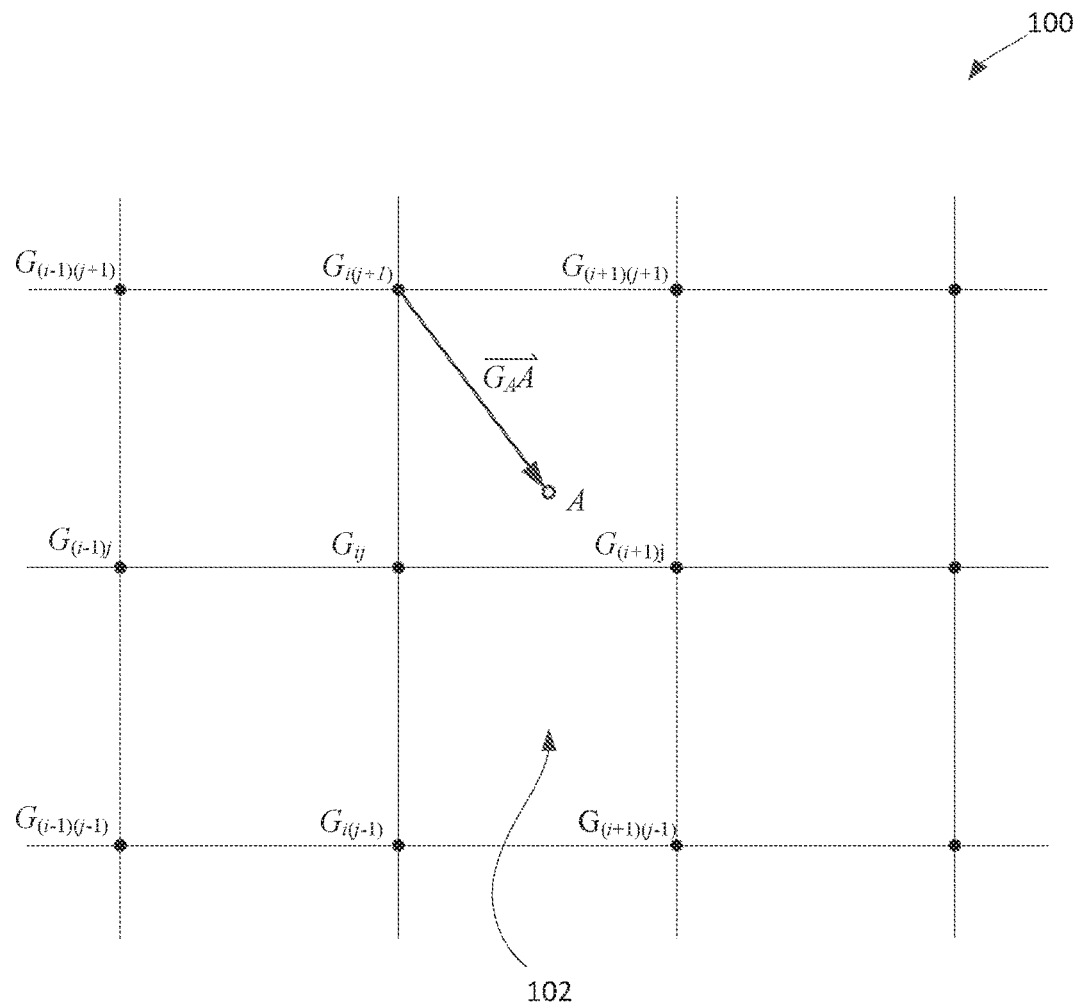
FIG. 1 shows an example of a quantized geographic coordinate system.

The present application describes methods and devices for coding and communicating geographical position. The sending device quantizes the geographical coordinate system and sends its position as the delta or remainder after quantization. The receiving device determines its own quantized position and disambiguates between possible quantized coordinate positions of the sending device to identify the sending device's actual quantized coordinate position. From this, the receiving device determines the position of the sending device using the identified actual quantized coordinate position and the delta position data sent by the sending device. The receiving device may then trigger an action based on the determined position of the sending device.

In one aspect, the present application describes a method of determining a geographic position of a sending device using a communications channel between a receiving device and the sending device, the sending device being nearby the receiving device. The method may include receiving, at the receiving device from the sending device over the communications channel, a message containing delta position data for the sending device from which a delta position can be determined; determining a coordinate position of the receiving device and quantizing the coordinate position of the receiving device to obtain a receiving device quantized coordinate position; disambiguating between candidate quantized coordinate positions for the sending device to identify a sending device quantized coordinate position used by the sending device to determine the delta position data; determining a coordinate position of the sending device by adding the delta position to the identified sending device quantized coordinate position; and causing an action based on the determined coordinate position of the sending device.

In another aspect, the present application describes a receiving device for determining a geographic position of a sending device using a communications channel between the receiving device and the sending device, the sending device being nearby the receiving device. The receiving device may include a wireless communications subsystem to receive, from the sending device over the communications channel, a message containing delta position data for the sending device from which a delta position can be determined; a processor; and a geographic position application executable by the processor and containing instructions. When executed by the processor, the instructions may cause the processor to determine a coordinate position of the receiving device and quantizing the coordinate position of the receiving device to obtain a receiving device quantized coordinate position, disambiguate between candidate quantized coordinate positions for the sending device to identify a sending device quantized coordinate position used by the sending device to determine the delta position data, determine a coordinate position of the sending device by adding the delta position to the identified sending device quantized coordinate position, and cause an action based on the determined coordinate position of the sending device.

In yet a further aspect, the present application describes non-transitory computer-readable media storing computer-executable program instructions which, when executed, cause one or more processors to perform the described methods.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

References in the examples below to "location" or "position" are intended to refer to a geographic position in a coordinate system, typically of global scale, such as latitude and longitude coordinates. The terms "location" and "position" are used interchangeably herein.

As noted above, location information is useful in intelligent transportation systems since one device may need to determine the location of another device, either or both of which could be in motion. V2X communications may involve a vehicle reporting its position to another device, which may be in motion or stationary. It may also involve a device reporting its location to a vehicle, where that device is either in motion or stationary. The receiving device that obtains the position information with regard to the other device then is able to take some action based on the position information. There are a wide range of possible actions that could be taken, depending on the specifics of the implementation. In the case where the receiving device is a vehicle and the sending device is another vehicle, example actions may include causing the vehicle to take physical action such as braking, steering or other evasive maneuvers; causing a warning signal to be output due to the proximity of the other vehicle; and mapping the other vehicle on a displayed map or stored virtual coordinate space for tracking nearby objects. In the case where the receiving device is a vehicle and the sending device is roadside device, example actions may include outputting a notification, such as a warning of a nearby obstruction, toll, emergency, or other event; outputting a notification of a nearby retail offer or opportunity; and mapping the roadside device on a displayed map or stored virtual coordinate space for tracking nearby objects. In the case where the receiving device is a roadside device and the sending device is a vehicle, example actions may include charging a toll; notifying enforcement services; mapping the vehicle to a stored virtual coordinate space for tracking nearby vehicles. The full range of other possible actions enabled through determining the position of a nearby device in the context of V2X communications will be appreciated by those ordinarily skilled in the art.

As mentioned, geographic location information is typically determined using a GNSS, like GPS or similar such systems. A geographic position may be expressed using latitude and longitude coordinates. Latitude and longitude are typically expressed as:

| | |
|---|---|
| Degrees-arcminutes-arcseconds: | D°M'S.ss" |
| Degrees-arcminutes: | D°M.mm' |
| Degrees [decimal]: | D.dd° |

The latitude coordinates have a 180 degree range (e.g. [−90°, 90°) or [0°, 180°)) and the longitude coordinates have a 360 degree range (e.g. [−180°, 180°) or [0°, 360°)). Because the Earth is not a perfect sphere, various geodesic systems exist (e.g. WGS84) for describing a reference ellipsoid. In some examples, to describe a point with approximately 1 meter resolution, the longitude and latitude coordinates in decimal degrees need five decimal places of precision:

$$\frac{1m}{r} \times \frac{180°}{\pi} = 0.000009 \ldots° \approx 0.00001°$$

When expressed in decimal degrees, the coding of latitude and longitude can be accomplished using a variety of coding schemes, such as:

| | | |
|---|---|---|
| ASCII | DDD.ddddd | 64 bit |
| BCD | DDD.ddddd | 32 bit |
| Floating-point | D.DDdddd × 10² | 64 bit |
| Fixed-point | — | 24 bit (latitude); 25 bit (longitude) |

In the case of V2X communications, the two devices or endpoints involved in the communication are presumably in relatively close proximity, since vehicle communications do not involve location-determination for elements located a long distance away. Accordingly, in accordance with one aspect of the present application, the presumption of close proximity may be exploited to compress and encode the geographic location information. The payload may thereby be shortened, resulting in a lower likelihood of channel collision, improved bandwidth usage, and/or transmission power savings.

The relative proximity of the two devices or endpoints means there is significant redundancy in encoding and sending full global geographic coordinates, such as latitude and longitude coordinates. Accordingly, this redundancy can be expressed as:

Position=Common Reference+Delta

The common reference portion may be considered the position component quantized to a coarse granularity. The delta is the remainder. The delta may be referred to herein as the "error" or "residual".

In other words, the geographic coordinate system may be quantized by a quantization step size to create a graticule (grid) with a resolution of the quantization step size. The receiving device knows or determines its own position in the geographic coordinate system. The receiving device may then determine the geographic position of the sending device based on the error data sent by the sending device in combination with either the known propagation limits of the communication medium (e.g. RF range) or encoded information from which the common reference can be identified. Examples of both are provided below.

Reference is now made to FIG. 1, which illustrates an example quantized geographic coordinate system 100. The coordinate system 100 in this example is a Cartesian coordinate system, although other examples may use other coordinate types. The system may be quantized by a quantization step size q. In particular, in this example, the quantization may be based on a "floor" quantization of each of the coordinates, resulting in a grid of quantized coordinate positions $G_{ij}$. For example, all points in square 102 in the illustrated system 100 are quantized to $G_{ij}$.

There may be a position A, where the notation A indicates the unquantized two-component coordinate position of a device A. The position A may be quantized to $G_A$, where the position of $G_A$, is given by:

$$G_A = q \left\lfloor \frac{A}{q} \right\rfloor$$

In the illustrated example, the quantized coordinate position for point A is $G_A = G_{i(j+1)}$. The vector $\overrightarrow{G_A A}$ from the quantized coordinate position for point A to the actual position of point A is the residual (error or delta) from the quantization operation.

Instead of sending a device B the full geographic coordinates for position A, the device A may send only the delta, i.e. vector $\overrightarrow{G_A A}$, and device B can determine the position of device A by determining its quantized coordinate position $G_A$ and then adding the received error vector $\overrightarrow{G_A A}$ to find position A.

Figure 2:
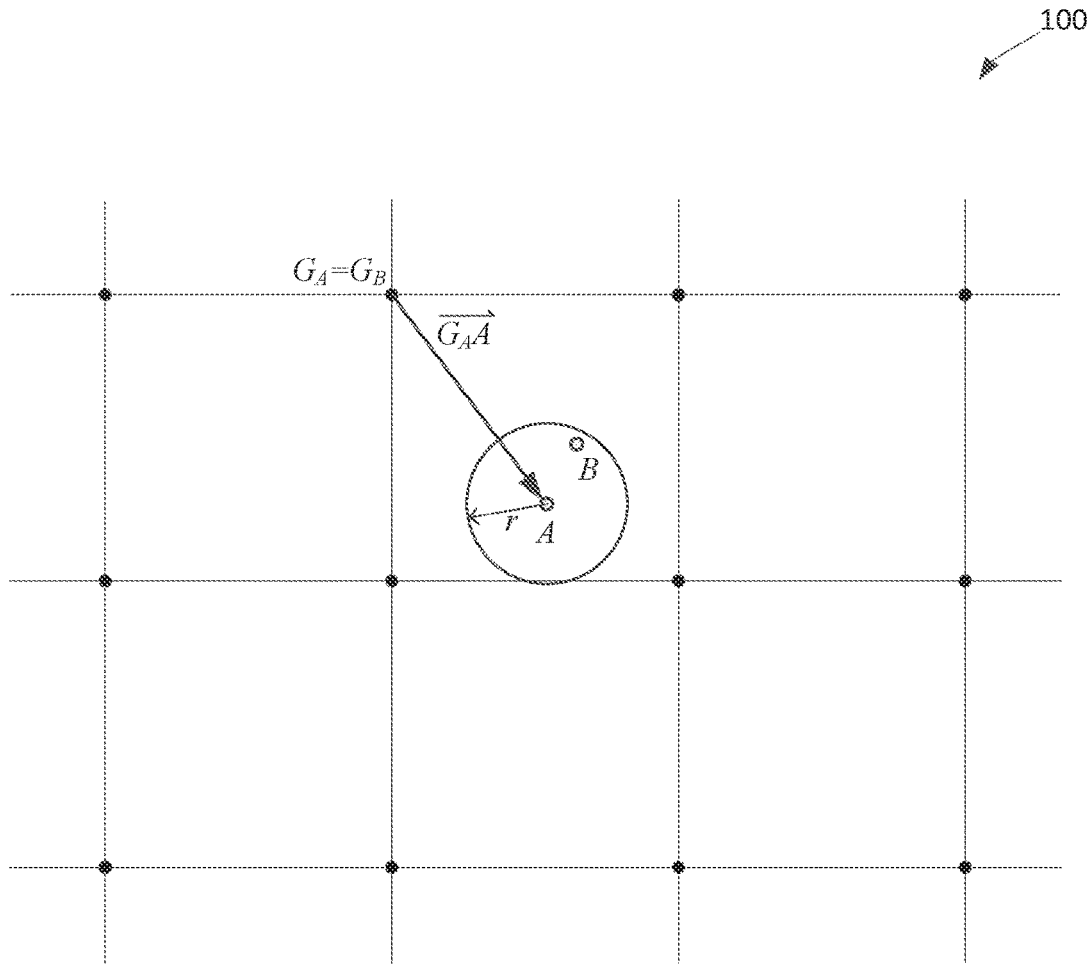
FIG. 2 shows an example of range-limited position determination within a quantized geographic coordinate system between two devices.

Device B is able to determine the quantized coordinate position of device A in any one of a few different possible ways. Reference is now made to FIG. 2, which shows the position A of device A and the position B of device B. Device A and device B communicate over a communications channel using a wireless communication protocol. Examples protocols include WiFi™, Bluetooth™, DSRC (Dedicated Short Range Communications), and others. The communications channel in this example is a short-range communications channel having a range r. The range r may be defined, in some implementations, as the distance over which communications can be carried out without channel errors exceeding a threshold rate at a given power.

Device A determines its position A, quantizes it to $G_A$, determines the error or delta as given by vector $\overrightarrow{G_A A}$, and sends vector $\overrightarrow{G_A A}$ to device B over the communications channel. Device B determines (or has already determined, if stationary) its own position B, and quantizes its position B to obtain quantized coordinate position $G_B$. If device B can assume that its quantized coordinate position $G_B$ is the same as device A's quantized coordinate position $G_A$, then it can determine a position of device A as $A' = G_B + \overrightarrow{G_A A}$. In the example illustrated in FIG. 2 the assumption works because both device A and device B will have the same quantized coordinate position. That is, $G_A = G_B$. However, this may not be the case in all situations.

Figure 3:
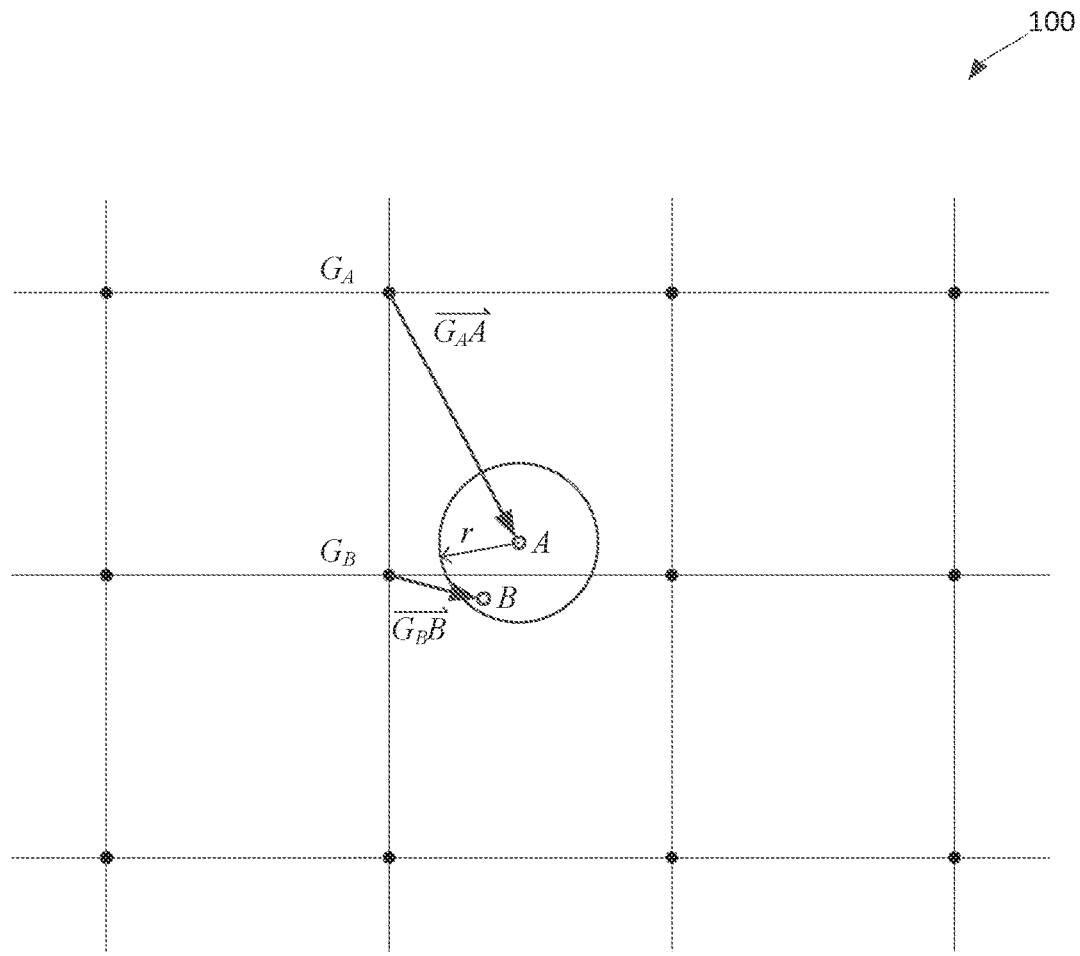
FIG. 3 shows a further example of position determination within a quantized geographic coordinate system between two devices, and potential ambiguities to be resolved in determining position.

FIG. 3 illustrates a case in which device A and device B have different quantized coordinate positions despite being within range r of each other. Accordingly, device B disambiguates between possible quantized coordinate positions for device A in order to determine device A's position A.

In the case where the communication occurs over a short-range channel, where range r is less than or equal to $$\frac{1}{2} q$$

(to avoid aliasing), then the device B is able to disambiguate because it knows that the position of A must be within range r of position B. In other words, because of the position of device B, there is limited area within which device A can be located near device B. Device B may, in one implementation, identify the nearby quantized coordinate positions—which may be termed, the candidate quantized coordinate positions. Using these nearby quantized coordinate positions, the device B may determine a set of candidate coordinate positions for device A by adding to each candidate quantized coordinate position the delta given by vector $\overrightarrow{G_A A}$ and assessing whether that results in a position A' within a distance r from position B. In one example, the candidates include $G_B$ and the eight quantized coordinate positions $G_{ij}$ around $G_B$.

In another example technique, the candidates may be narrowed down based on $\overrightarrow{G_A A}$ and/or $\overrightarrow{G_A B}$ without explicitly calculating the candidate positions A'. For instance, if $\overrightarrow{G_A B}$ indicates that position B is less than r distant from a border of its quantized coordinate position, such as the upper boundary of its quantization square, then it may include the candidate quantized positions shown above $G_B$ in the figure (i.e. the $G_{i(j+1)}$ locations) and may exclude the quantized positions below $G_B$ in the figure, since they would necessarily result in a candidate position A that is more than the range r away from position B. Similar analysis may take place with regard to the magnitude of the components of vector $\overrightarrow{G_A A}$ to reduce the set of candidates. The impact is the same in terms of narrowing down the resulting possible positions A' until arriving at the only one that results in a position A of device A that is within a range r of device B.

In yet another example implementation, since, by definition, $|\overrightarrow{AB}| < r$, each component of A' may vary by ±q, and device B may find a position A' that results in an $|\overrightarrow{AB}|$ where each component is less than r. In other words, using the starting point position A' that is given by $G_B + \overrightarrow{G_A A}$, device B may, for each component of the position of device A, determine it based on:

$$A = A' - q \times \text{round}\left(\frac{A' - B}{q}\right)$$

Effectively, device B finds the position A that is an image (modulo q) of position A' that falls within the range r, meaning $|\overrightarrow{AB}| < r$.

Any of these above-described implementations or techniques may be described generally as disambiguating between candidate coordinate positions to identify the actual quantized coordinate position $G_A$ used by device A and, on that basis, identifying the actual coordinate position A of device A. Each of the above-described example techniques base the disambiguation on the range r of the short-range communication, where r is less than half the quantization step size q to avoid aliasing.

By coding only the error or delta, i.e. vector $\overrightarrow{G_A A}$, significant overhead is saved in transmitting geographical coordinates. For example, in a system in which position resolution is set at 1.2 meters, and where the quantization step size q is set at 1.2 km, the 24 to 25 bits required to send coordinate data can be reduced to 10 bits. In particular, with reference to different coding systems, the following savings may be realized:

| Encoding | | Bits(full) | Bits(residual) | Saving |
|---|---|---|---|---|
| ASCII | DDD.ddddd | 64 | 24 | 62% |
| BCD | DDD.ddddd | 32 | 12 | 62% |
| Floating-point | D.DDdddd × $10^2$ | 64 | 32 | 50% |
| Fixed-point | — | 24/25 | 10 | 58/60% |

Saving 50-62% of the transmission payload may significantly improve bandwidth usage, save transmission power or energy, and avoid, or at least reduce, channel collisions. Through shorter transmission payloads, the described position coding system may also improve the speed of position determinations by device B and, thus, any consequent action taken based on the position determination. Increased transmission efficiencies may also permit systems that act as beacons such as traffic junction controllers or temporary warning signs to transmit more frequently, thereby increasing the opportunity for reception by fast moving vehicles.

In some other example implementations, the disambiguation may rely on data other than the range constraint. If other data may be used to disambiguate between possible quantized coordinate positions of device A, then the range constraint may be relaxed. For example, in coding the message to device B that provides the vector $\overrightarrow{G_A A}$, the quantized coordinate position $G_A$ may be used in the coding such that device B can determine from the message content which of the candidate quantization positions corresponds to $G_A$.

For instance, device A's quantized coordinate position $G_A$ may be used in an error checking protocol through which device B is able to disambiguate between candidate coordinate positions. In some implementations, this is built into an error checking portion of the message containing position data such that no additional bits are expended. As one example, the message may contain a message authentication code (MAC), such as a hash-based message authentication code (HMAC), that the receiving device uses to verify the integrity of the message. The structure of a message using an error checking scheme may be: [mac, payload], where the payload is the vector $\overrightarrow{G_A A}$, and any other data being communicated to device B, and the mac is a hash or checksum of the payload. Through hashing the received payload and comparing with the received MAC, the receiving device is able to confirm error-free receipt of the message.

In one example implementation, the quantized coordinate position $G_A$ may be included in generating the mac data. For example, the mac data may be generated by device A as: mac=HMAC (key++$G_A$, payload), with the operator ++ representing augmentation. Augmentation, in this context, may be optional and may include, as examples, concatenation, XOR, further hashing, etc. Device B can disambiguate between candidate quantized coordinate positions by attempting to authenticate the payload by computing the hash with each candidate and the payload to see which one matches the mac data. If none of them match, there is either an error in the transmission, or $G_A$ is beyond the search range of device B, but if one of them matches, then device B has determined the correct candidate quantized coordinate position $G_A$ and can therefore determine position A using the vector $\overrightarrow{G_A A}$. The set of candidate quantized coordinate positions may be those positions surrounding device B's location in a search range, which may or may not be based on the communication range r. That is, the range r may exceed 0.5q since aliasing may be resolved through use of the quantized coordinate position $G_A$ in message coding, in which case the restraint on the communication range r is then related directly to the number of candidate quantized coordinate positions searched in trying to authenticate the payload.

Reference may be made herein to hashing a "string" that includes at least a candidate quantized coordinate position. In this sense a "string" may be a sequence of binary data that includes, at least, a candidate quantized coordinate position. The string may include other data, as noted above, such as the payload or other such data.

It will be appreciated that some embodiments may use disambiguation based on the limited range r of the communications channel and may also employ the quantized coordinate position $G_A$ in generating the hash-based message authentication code, so that the device B has a mechanism for double-checking its disambiguation and the integrity of the message received.

Both devices A and B use the same quantization step size q. The value of q may be specified in advance and hard-coded in some implementations. In other implementations, the value of the quantization step size q may be signaled from device A to device B in the message or its metadata. For example, the value may be a part of the payload. It may be sent as an absolute value or in a logarithmic scale. In some cases, a set of predefined q values may have been established such that device A signals only an index that indicates which q is to be used by device B. In some implementations, the value q may be determined by each device based on other factors relating to the communications, such as the transmission power used, the category of device sending the communication (e.g. a vehicle versus roadside equipment), the protocol being used, the communications channel being used, etc.

Figure 4:
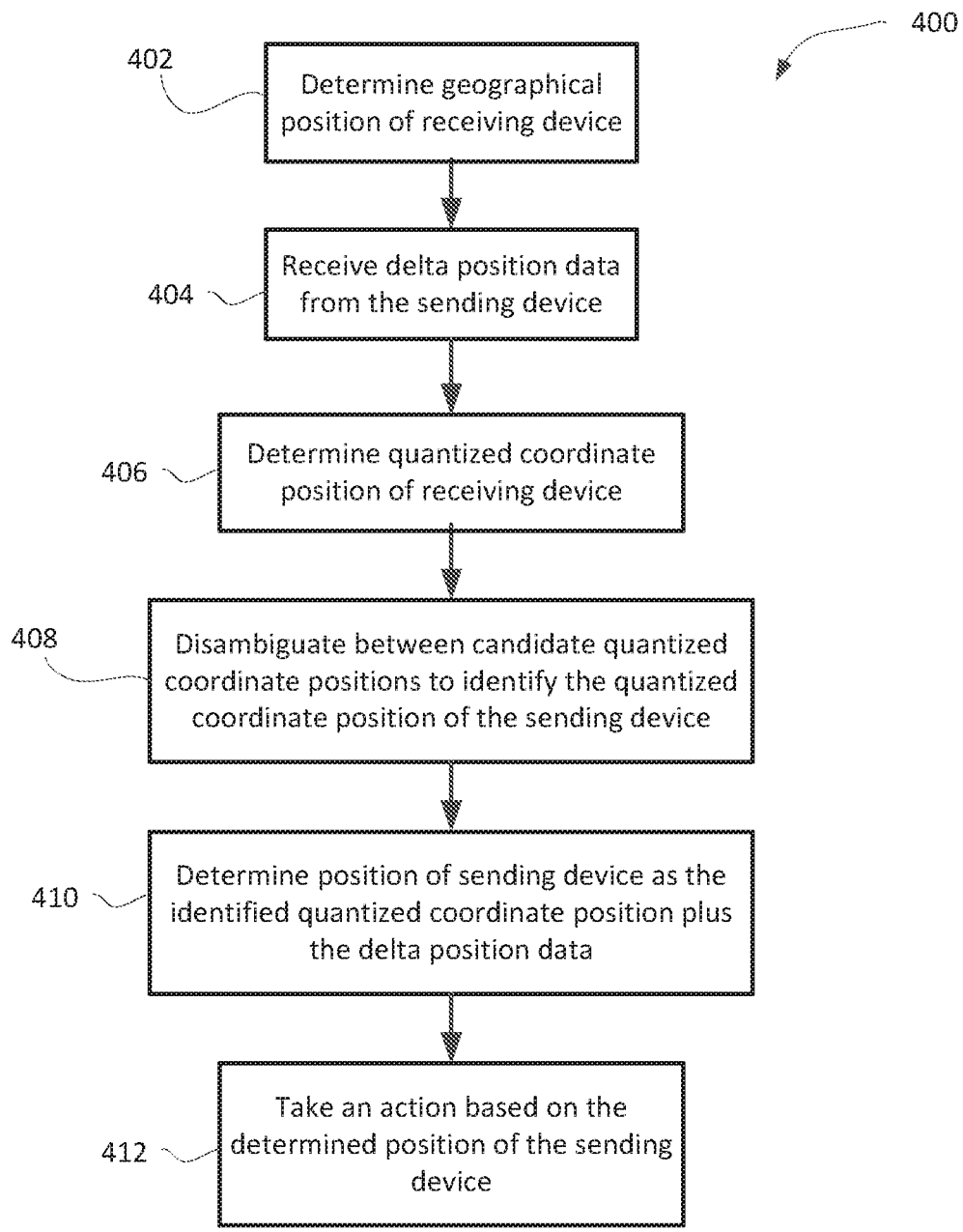
FIG. 4 shows, in flowchart form, one example method for determining, by a receiving device, a geographic position of a sending device.

Reference is now made to FIG. 4, which shows, in flowchart form, one example method 400 of determining a nearby device's geographical position. The method 400 is carried out by a receiving device, e.g. device B in the examples described above. The receiving device determines its own position in operation 402. If the receiving device is a stationary device, it may have this position data predetermined and saved in memory or hardcoded. If the receiving device is static but has a geographic-position determination system, like a GPS, it may dynamically determine its position. If the receiving device is moving, then it may dynamically determine its position. In this context "dynamically" refers to determining the position of the receiving device at the time of carrying out the method 400 very close in time to the other steps of the method, as opposed to having it pre-determined and available for use in the method 400 irrespective of when the method 400 is performed. Operation 402 may be triggered by receipt or detection of a message from the sending device, for example.

In operation 404, the receiving device obtains delta position data (i.e. the residual represented by vector $\overrightarrow{G_A A}$) from the message received from the sending device. The message is received over the communications channel between the devices which, in some embodiments, is a short-range communications channel like DSRC having a localized maximum range r.

In this example, the receiving device determines its own quantized coordinate position $G_B$ in operation 406. This may include determining the quantization step size q in cases where it is not fixed.

In operation 408, the receiving device disambiguates between candidate quantized coordinate positions to identify the quantized coordinate position $G_A$ of the sending device.

As described above, in one example implementation the disambiguation may involve testing individual candidate positions by calculating the position of the sending device based on the delta position data and candidate quantized coordinate positions, to find a position within less than the range r distance from the position of the receiving device. The set of candidate quantized coordinate positions include the quantized coordinate position $G_B$ of the receiving device and nearby quantized coordinate positions. In another example implementation, the disambiguation involves reducing the set of candidate quantized coordinate positions based on the magnitude of the components of the vector $\overrightarrow{G_A A}$ and/or the magnitude of the components of the vector $\overrightarrow{G_B B}$, and the communication range r. In some examples, modulo arithmetic based on the quantization step size q may be used to quickly identify the candidate quantized coordinate position that will result in a position A within the range r from position B given the delta position data $\overrightarrow{G_A A}$.

In another set of examples, the disambiguation may not be based on the position of the sending device being within the range r from the receiving device, but instead is based on decoding of side data contained within the message. As illustrated above, the quantized coordinate position $G_A$ may be used in generating a portion of the message such that the receiving device is able to determine which of the candidate quantized coordinate position matches $G_A$. In one example shown above, the quantized coordinate position $G_A$ of the sending device is included by the sending device in a hash-based message authentication code, such that the receiving device may identify the correct candidate quantized coordinate position matching $G_A$ by performing the same hash of data including the candidates in turn.

Irrespective of the technique used, once the correct quantized coordinate position of the sending device has been determined by the receiving device, the receiving device then determines the position of the sending device in operation 410. The position of the sending device is determined as the identified quantized coordinate position plus the delta position data, i.e. vector $\overrightarrow{G_A A}$. It will be appreciated that, in some instances, this calculation may be performed as a part of the disambiguation operation 408.

Having determined the position of the sending device, the receiving device is then able to use that determined position in connection with taking some action relating to the position of the sending device, as indicated by operation 412. The range of actions varies depending on the precise V2X application being implemented and the nature of the devices. Examples are described above, including causing automotive evasive action, outputting a warning or notification signal, and mapping the position to a displayed map or stored virtual coordinate system tracking the positions of objections in the area around the receiving device.

The above-described methods and devices relate to determination of position within the receiving device. In some implementations, some or all of the receiving device operations may be implemented using a remote server. In one example implementation, a server that is aware of a device A's position or quantized position $G_A$ may receive updated position information $\overrightarrow{G_A A}$. In another example implementation, a device B with a known position receives transmitted delta position information from nearby device A and relays this information to a server which resolves the true position of the device A using the described methods. Furthermore, a server that is aware of an endpoint's position, may use the described methods to relay location information about other nearby objects to an endpoint. Such a technique has advantages over transmitting position information relative to the last known position of the receiving endpoint by reducing the resolved position uncertainty of the object caused by drift between the true position of the receiving endpoint and the server's knowledge of that position. Such drift may be caused in part due to displacement of the endpoint (intended or unintended), or latency of transmissions involving a moving receiving endpoint.

The above-described methods and devices illustrate use of the described coding techniques for communicating and determining geographic position for nearby devices, since the "nearby" aspect of the sending device implies there is redundancy in the full geographic coordinates. The examples relate to two-dimensional coordinates, but may be applied to 1-d or 3-d coordinates, for example. Similarly, the value of q is not required to be a constant over all dimensions, for example, in a three-dimensional system, a height component may have a different range and resolution to the other lateral dimensions. These techniques and processes may be applied with suitable modifications to other parameters for applications in which redundancy is implicit in coding and communicating the parameter. For example, in many applications time (a 1-d system) may be expressed in a form that includes substantial common reference data. As an illustration, UNIX time is a scalar real number representing seconds since 00:00:00 UTC Jan. 1, 1970. If a device is communicating such a time value to another device, there may be significant redundancy in the full value. Using the above-described techniques, the devices may quantize the time series and the receiving device may determine the sent time by determining the quantized time and adding the delta time sent by the sending device. When quantizing the 1-d time series, the "range" to be taken into account in selecting a suitable quantization steps size such a system may be the round trip communication delay between the devices plus some permissible error and/or processing time. This may occur, for example, if the message is to include a time stamp, but the two devices are both synchronized to UTC by a GPS receiver. In such a situation, the time series may be quantized and the sending device may include only the delta time in the message.

Figure 5:
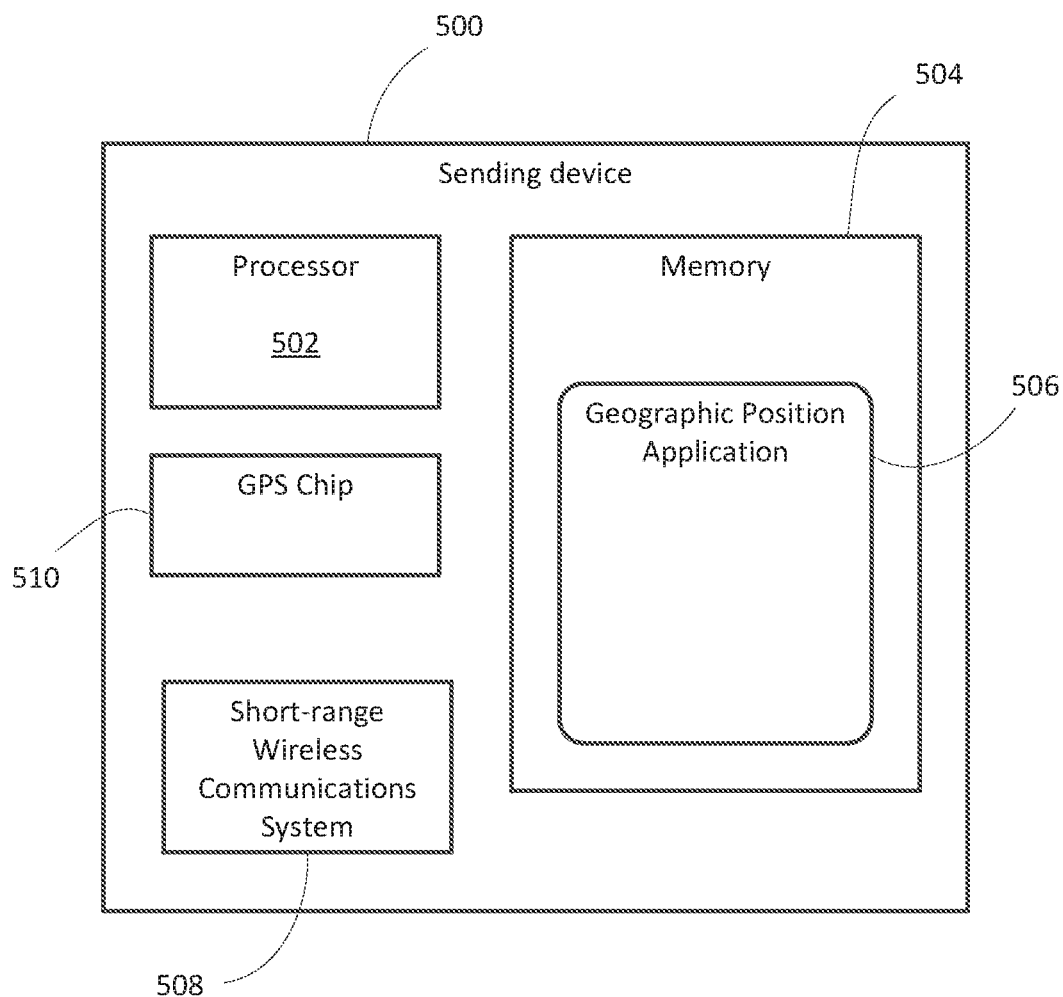
FIG. 5 shows an example simplified block diagram of a sending device.

Reference is now made to FIG. 5, which shows a simplified block diagram of an example embodiment of a sending device 500. The sending device 500 includes a processor 502, memory 504, a geographic position application 506, and a wireless communication subsystem 508. The wireless communication subsystem 508 may be a short-range wireless communication system that implements a short-range wireless communication protocol, like WiFi™, Bluetooth™, DSRC, or others. In this embodiment, the sending device 500 further includes a GPS chip 510 for determining current geographic position coordinates for the sending device 500. The geographic position application 506 may include a computer program or application stored in memory 504 and containing instructions that, when executed, cause the processor 502 to perform operations such as those described herein. For example, the geographic position application 506 may receiving geographic position data from the GPS chip 510 and may encode and output a message over the wireless communication subsystem 508 in accordance with the processes described herein. It will be understood that the geographic position application 506 may be stored on a non-transitory computer-readable medium, such as a compact disc, flash memory device, random access memory, hard drive, etc. When the instructions are executed, the processor 502 carries out the operations and functions specified in the instructions so as to operate as a special-purpose processor that implements the described process(es). Such a processor may be referred to as a "processor circuit" or "processor circuitry" in some examples.

Figure 6:
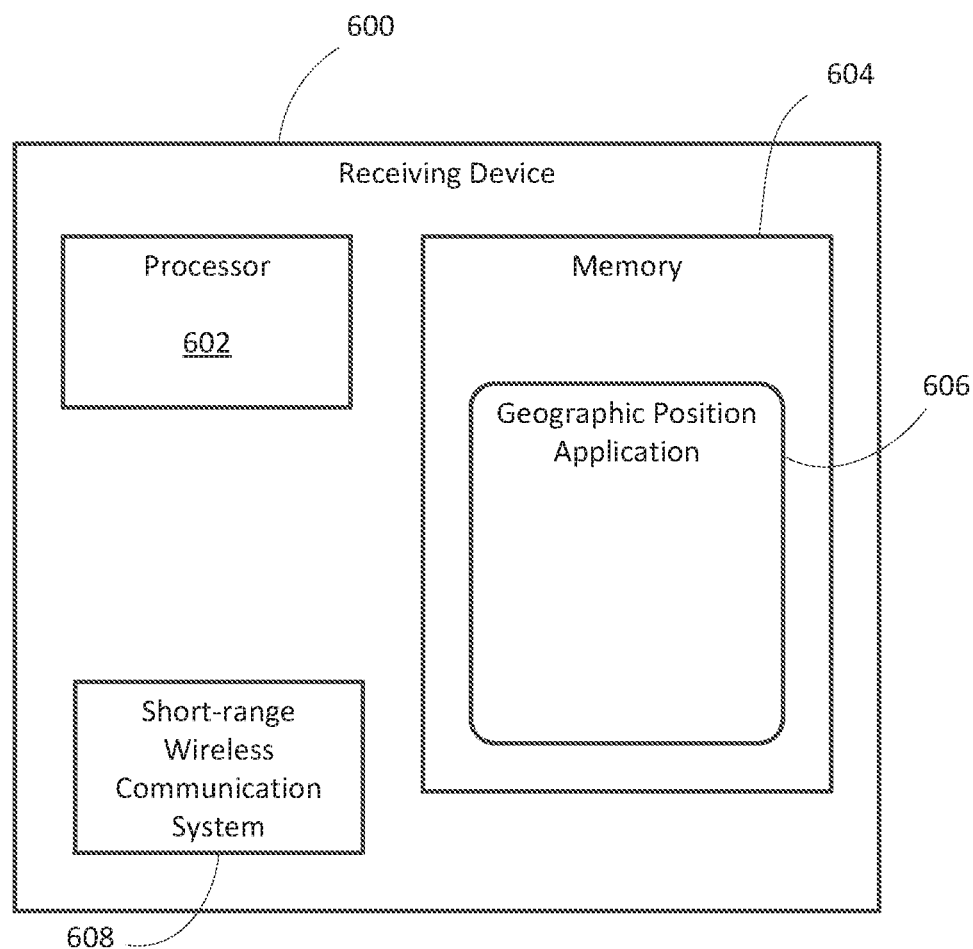
FIG. 6 shows an example simplified block diagram of a receiving device.

Reference is now also made to FIG. 6, which shows a simplified block diagram of an example embodiment of a receiving device 600. The receiving device 600 includes a processor 602, a memory 604, a geographic position application 606, and a wireless communication subsystem 608. The geographic position application 606 may include a computer program or application stored in memory 604 and containing instructions that, when executed, cause the processor 602 to perform operations such as those described herein. A message from a sending device may be received by the wireless communication subsystem 608, demodulated, and provided to the processor 602 and/or geographic position application 606. The message contains delta position data for the sending device and the instructions executed by the processor 602 in accordance with the geographic position application 606 determine the position of the sending device. The processor 602 then takes an action based on the determined position of the sending device. It will be understood that the geographic position application 606 may be stored on a computer-readable medium, such as a compact disc, flash memory device, random access memory, hard drive, etc. When the instructions are executed, the processor 602 carries out the operations and functions specified in the instructions so as to operate as a special-purpose processor that implements the described process(es). Such a processor may be referred to as a "processor circuit" or "processor circuitry" in some examples.

It will be appreciated that the sending and/or receiving devices according to the present application may be implemented in a number of computing devices, at least one of which may be implemented within a vehicle.

It will be understood that the sending and/or receiving devices described herein and the module, routine, process, thread, or other software component implementing the described method/process for configuring the sending and/or receiving devices may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

The present application also provides for a computer-readable signal encoding the data produced through application of the coding process in accordance with the present application.

Certain adaptations and modifications of the described embodiments can be made. Therefore, the above discussed embodiments are considered to be illustrative and not restrictive.

What is claimed is:

1. A method of determining a geographic position of a sending device using a communications channel between a receiving device and the sending device, the sending device being nearby the receiving device, the method comprising:
receiving, at the receiving device from the sending device over the communications channel, a message containing delta position data for the sending device from which a delta position can be determined;
determining a coordinate position of the receiving device and quantizing the coordinate position of the receiving device to obtain a receiving device quantized coordinate position;
disambiguating between candidate quantized coordinate positions for the sending device to identify a sending device quantized coordinate position used by the sending device to determine the delta position data;
determining a coordinate position of the sending device by adding the delta position to the identified sending device quantized coordinate position; and
causing an action based on the determined coordinate position of the sending device.

2. The method claimed in claim 1, wherein the communication channel has a range and wherein the disambiguating includes identifying the sending device quantized coordinate position among the candidate quantized coordinate positions based on a sum of the sending device quantized coordinate position data and the delta position resulting in a sending device coordinate position less than the range distant from the receiving device coordinate position.

3. The method claimed in claim 2, wherein the message further includes a hashed message authentication code, and the method further includes validating the identified sending device quantized coordinate position by hashing a string that includes at least the identified sending device quantized coordinate position and confirming that the hashed string matches the hashed message authentication code.

4. The method claimed in claim 1, wherein the message further includes a hashed message authentication code, and disambiguating includes hashing strings, each string including a respective candidate quantized coordinate position and determining which of the hashed strings corresponds to the hashed message authentication code, wherein the matching hashed string includes the sending device quantized coordinate position.

5. The method claimed in claim 4, wherein each string includes at least a concatenation of the delta position data with the respective candidate quantized coordinate position, wherein hashing includes determining which of the hashes matches the hashed message authentication code.

6. The method claimed in claim 1, wherein the message includes data indicating the quantization step size.

7. The method claimed in claim 6, wherein the data comprises an index identifying a selected one of two or more pre-determined quantization step sizes.

8. The method claimed in claim 1, wherein the coordinate position includes a latitude or longitude measurement.

9. The method claimed in claim 8, wherein the latitude or longitude measurement is in decimal degrees.

10. The method claimed in claim 1, wherein the disambiguating includes determining a set of the candidate quantized coordinate positions based on the receiving device quantized coordinate position.

11. The method claimed in claim 10, wherein the set includes the receiving device quantized coordinate position and at least one neighbouring quantized coordinate position in a quantized geographical coordinate system grid.

12. The method claimed in claim 1, wherein at least one of the sending device and the receiving device is implemented within a vehicle.

13. A receiving device for determining a geographic position of a sending device using a communications channel between the receiving device and the sending device, the sending device being nearby the receiving device, the receiving device comprising:

a wireless communications subsystem to receive, from the sending device over the communications channel, a message containing delta position data for the sending device from which a delta position can be determined;
a processor; and
a geographic position application executable by the processor and containing instructions that, when executed by the processor, are to cause the processor to:
 determine a coordinate position of the receiving device and quantizing the coordinate position of the receiving device to obtain a receiving device quantized coordinate position,
 disambiguate between candidate quantized coordinate positions for the sending device to identify a sending device quantized coordinate position used by the sending device to determine the delta position data,
 determine a coordinate position of the sending device by adding the delta position to the identified sending device quantized coordinate position, and
 cause an action based on the determined coordinate position of the sending device.

14. The receiving device claimed in claim 13, wherein the communication channel has a range and wherein the processor is to disambiguate by identifying the sending device quantized coordinate position among the candidate quantized coordinate positions based on a sum of the sending device quantized coordinate position and the delta position resulting in a sending device coordinate position distant from the receiving device coordinate position by less than the range.

15. The receiving device claimed in claim 14, wherein the message further includes a hashed message authentication code, and wherein the instructions are to further cause the processor to validate the identified sending device quantized coordinate position by hashing a string that includes at least the identified sending device quantized coordinate position and confirming that the hashed string matches the hashed message authentication code.

16. The receiving device claimed in claim 13, wherein the message further includes a hashed message authentication code, and wherein the processor is to disambiguate by hashing strings, each string including a respective candidate quantized coordinate position and determining which of the hashed strings corresponds to the hashed message authentication code, wherein the matching hashed string includes the sending device quantized coordinate position.

17. The receiving device claimed in claim 16, wherein each string includes at least a concatenation of the delta position data with the respective candidate quantized coordinate position, wherein hashing includes determining which of the hashes matches the hashed message authentication code.

18. The receiving device claimed in claim 13, wherein the message includes data indicating the quantization step size.

19. The receiving device claimed in claim 18, wherein the data comprises an index identifying a selected one of two or more pre-determined quantization step sizes.

20. The receiving device claimed in claim 13, wherein the coordinate position includes a latitude or longitude measurement.

21. The receiving device claimed in claim 20, wherein the latitude or longitude measurement is in decimal degrees.

22. The receiving device claimed in claim 13, wherein the processor is to disambiguate by determining a set of the candidate quantized coordinate positions based on the receiving device quantized coordinate position.

23. The receiving device claimed in claim 22, wherein the set includes the receiving device quantized coordinate position and at least one neighbouring quantized coordinate position in a quantized geographical coordinate system grid.

24. The receiving device claimed in claim 13, wherein at least one of the sending device and the receiving device is implemented within a vehicle.

* * * * *